United States Patent
Giroir et al.

(10) Patent No.: US 6,799,215 B1
(45) Date of Patent: Sep. 28, 2004

(54) METHOD AND APPARATUS FOR PROVIDING LOGICAL UNIT DEFINITIONS FOR TELENET SERVERS

(75) Inventors: Didier Giroir, Cagnes sur Mer (FR); Olivier Hericourt, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 09/690,206

(22) Filed: Oct. 17, 2000

(30) Foreign Application Priority Data

Nov. 30, 1999 (EP) ............................................. 99480128

(51) Int. Cl.[7] ............................................. G06F 15/16
(52) U.S. Cl. ..................... 709/227; 709/228; 709/229; 709/249
(58) Field of Search .............................. 709/227, 200, 709/223, 224, 228, 229, 203, 249; 707/3, 10

(56) References Cited

U.S. PATENT DOCUMENTS

| | | | | |
|---|---|---|---|---|
| 5,910,981 A | * | 6/1999 | Bhagat et al. | 379/219 |
| 5,951,694 A | * | 9/1999 | Choquier et al. | 714/15 |
| 6,088,738 A | * | 7/2000 | Okada | 709/245 |
| 6,128,662 A | * | 10/2000 | Bolton et al. | 709/228 |
| 6,173,319 B1 | * | 1/2001 | Peterson et al. | 709/220 |

OTHER PUBLICATIONS

Hoberecht, V., "SNA Function Management" Communications, IEEE Transactions on [legacy, pre—1988], vol.: 28 Issue 4, Apr. 1980 pp.: 594–603.*

"IBM Systems Network Architecture (SNA) Routing", Internetworking Technology Overview, Jun. 1999. Document retrieved from http://www.itexamprep.com/files/ibm-snaro.pdf in Dec. 2003.*

Alexander, C.A.; Carriker, C.A., "Integrating the portable APPN protocol stack into a multiprotocol router" Southeastcon '95. 'Visualize the Future'., Proceedings., IEEE, Mar. 26–29, 1995 pp.: 133–141.*

* cited by examiner

Primary Examiner—William A. Cuchlinski, Jr.
Assistant Examiner—Tam T. Phan
(74) Attorney, Agent, or Firm—Daniel E. McConnell; John R. Pivnichny; Dillon & Yudell LLP (57) ABSTRACT

A method and system for centralizing the LU definitions for one or a plurality of TN3270 servers. More particularly, a method and system for dynamically providing a Systems Network Architecture (SNA) Logical Unit (LU) definition for the establishment of a SNA session between a SNA client and a SNA application. The method of the present invention includes receiving a SNA session request from a telnet 3270 client, and in response thereto, retrieving a definition of a SNA LU from a table shared by one or more telnet 3270 servers. A local table within the telnet 3270 server is dynamically updating with the retrieved SNA LU definition.

24 Claims, 9 Drawing Sheets

(Prior Art)

METHOD AND APPARATUS FOR PROVIDING LOGICAL UNIT DEFINITIONS FOR TELENET SERVERS

CROSS REFERENCE TO RELATED APPLICATIONS

The present application is related to the following copending U.S. Patent Application: U.S. patent application Ser. No. 09/690,616 filed on Oct. 17, 2000, titled "METHOD AND SYSTEM FOR OPTIMALLY DISPATCHING INTERNETWORK TRAFFIC".

BACKGROUND OF THE INVENTION

1. Technical Field

The present invention relates to computer networks, and more particularly to a method and system in an Internet Protocol (IP) network for centralizing Logical Unit (LU) definitions for one or a plurality of TN3270 Servers.

2. Description of the Related Art

SNA and IP Environment

Companies are increasingly interested in consolidating the multiple specialized networks that they operate or lease from service providers onto a single protocol network. These multiple specialized networks operate on diverse networking technologies such as Systems Network Architecture (SNA), Internet Protocol (IP) or Internetwork Packet Exchange (IPX). In making consolidation one of their top priorities, companies are almost exclusively selecting IP as their protocol of choice. For the overwhelming majority of these companies that are using SNA protocols and applications, however, there remains the need to maintain the ability to access the enormous quantity of existing corporate data that resides in traditional mainframes and only accessible through SNA applications.

Internet

The Internet is a global network of computers and computers networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet:

(1) transmitting and receiving electronic mail, (2) logging into remote computers (the "Telnet"), and (3) transferring files and programs from one computer to another ("FTP" or "File Transfer Protocol").

TCP/IP

The Transmission Control Protocol/Internet Protocol (TCP/IP) protocol suite is used to establish an interconnection of networks that provide universal communication services: an internetwork, or internet. Each physical network has its own technology dependent communication interface (in the form of a programming interface) that provides basic communication functions between the physical network and the user applications. The architecture of the physical networks is hidden from the user. TCP/IP also provides interconnection between different physical networks to form what appears to the user to be one large network.

TCP is a transport layer protocol providing end-to-end data transfer and is responsible for providing a reliable exchange of information between networked computer systems. Multiple applications can be supported simultaneously over one TCP connection between two computer systems.

IP is an internetwork layer protocol hiding the physical network architecture bellow it. Part of the communicating messages between computers is a routing function that ensures that messages will be correctly directed within the network to be delivered to their destination. IP provides this routing function. An IP message is called an IP datagram.

Application Level protocols are utilized in addition to TCP/IP to transfer user and application data from a computer system to a destination computer system. Examples of such Application Level protocols include File Transfer Protocol (FTP), Telnet, Gopher, Hyper Text Transfer Protocol (HTTP).

IP Router

A "router" is a computer that interconnects two networks and forwards messages from one network to the other. Routers select the best transmission path between networks utilizing the IP layer of the TCP/IP protocol stack, such that any host (or computer) or workstation running TCP/IP over more than one interface could, in theory, forward messages between networks. Because IP implements basic routing functions, the term "IP router" is often used. However, dedicated network hardware routers can provide more sophisticated routing functions than the minimum functions implemented in IP.

World Wide Web

With the increasing size and complexity of the Internet, tools that are often called navigators or navigation systems have been developed to help find information on the network. Navigation systems include standards such as Archie, Gopher and, most well-known, the World Wide Web ("WWW" or "the Web"). In addition to serving as an Internet-based navigation system, the Web is also an information distribution and management system for the Internet. The Web provides an end user with a seamlessly integrated format of information, including still images, text, audio and video. A user on the Web using a graphical user interface may transparently communicate with different host computers on the system, different system applications, and different information formats for files and documents including text, sound, and graphics.

Hypermedia

The Web uses hypertext and hypermedia. Hypertext is a subset of hypermedia and refers to computer-based "documents" in which readers move from one place to another in a document, or to another document, in a non-linear manner. To do this, the Web uses a client-server architecture. The Web servers enable the user to access hypertext and hypermedia information through the Web and the user's computer. (The user's computer is referred to as a client computer of the Web Server computers.) The clients send requests to the Web Servers, which react, search and respond. The Web allows client application software to request and receive hypermedia documents (including formatted text, audio, video and graphics) with hypertext link capabilities to other hypermedia documents, from a Web file server.

The Web, then, can be viewed as a collection of document files residing on Web host computers that are interconnected by hyperlinks using networking protocols, forming a virtual "web" that spans the Internet.

Uniform Resource Locators

A resource of the Internet is unambiguously identified by a Uniform Resource Locator (URL), which is a pointer to a particular resource at a particular location. A URL specifies the protocol used to access a server (e.g. HTTP, FTP, . . . ), the name of the server, and the location of a file on that server.

Hyper Text Transfer Protocol

Each Web page that appears on client monitors of the Web may appear as a complex document that integrates, for example, text, images, sounds and animation. Each such page may also contain hyperlinks to other Web documents so that a user at a client computer using a mouse may click on icons and may activate hyperlink jumps to a new page (which is a graphical representation of another document file) on the same or a different Web server.

A Web server is a software program on a Web host computer that answers requests from Web clients, typically over the Internet. All Web use a language or protocol to communicate with Web clients which is called Hyper Text Transfer Protocol ("HTTP"). All types of data can be exchanged among Web servers and clients using this protocol, including Hyper Text Markup Language ("HTML"), graphics, sound, and video. HTML describes the layout, contents and hyperlinks of the documents and pages. When browsing, Web clients: convert user specified commands into HTTP GET requests; connect to the appropriate Web server to get information; and wait for a response. The response from the server can be the requested document or an error message. After the document or an error message is returned, the connection between the Web client and the Web server is closed.

HTTP version 1.0 is a stateless protocol in which there is no continuous connection between each client and each server. A Web client using HTTP receives a response as HTML data or other data. The new HTTP version 1.1 breaks this barrier of stateless protocol by keeping the connection between the server and client alive under certain conditions.

Telnet 3270

Figure 1:
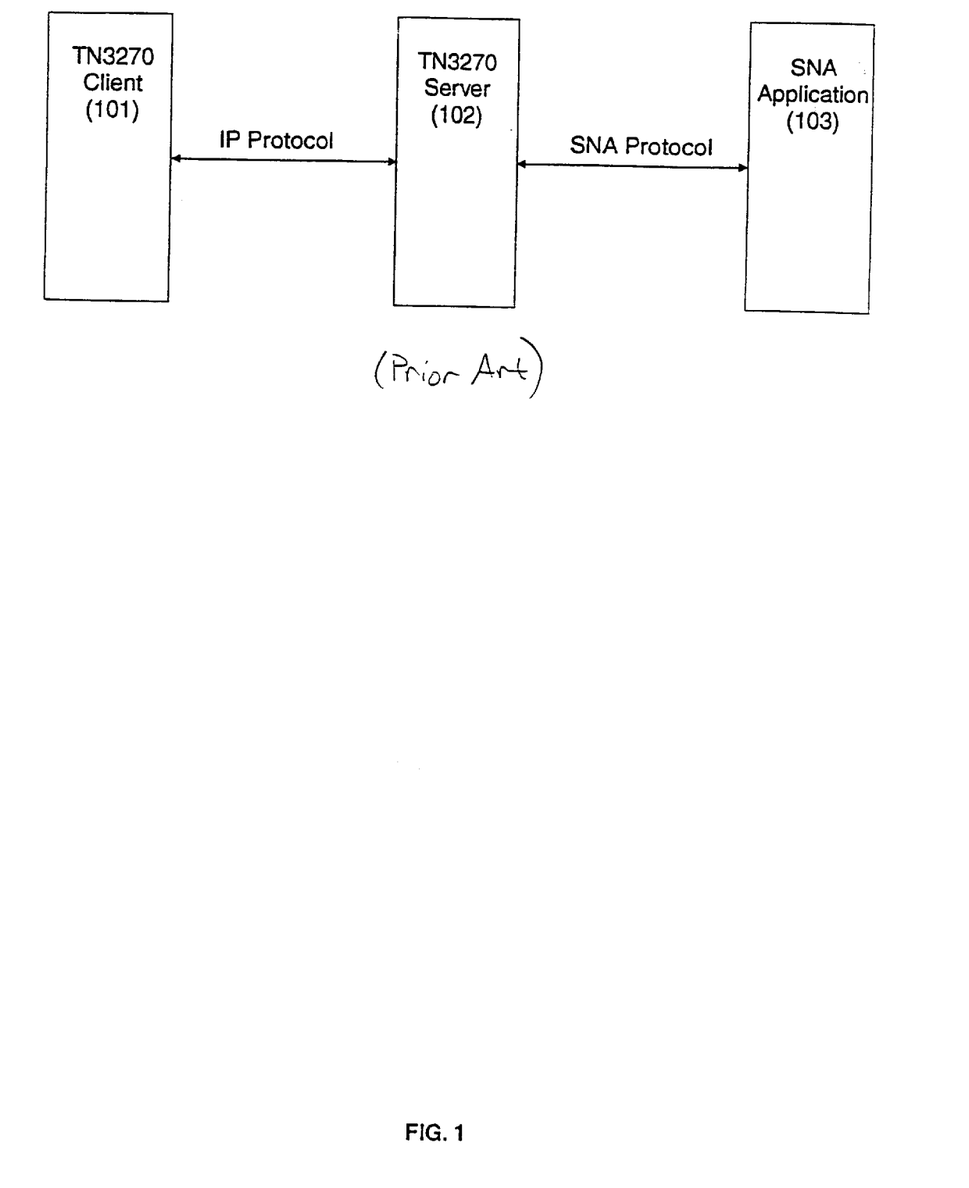
FIG. 1 is a block diagram illustrating conventional protocol connectivity between a TN3270 client and an SNA application in a TN3270 environment.

In an IP environment, telnet technologies (TN3270) is widely utilized to transport SNA information across an IP network. This technique for SNA "green screen" workstation users employs a Client/Server approach. IBM's "Host On Demand" or "WebClient" by CISCO are examples of client software implementations. Network Utility from IBM or CISCO router's offerings are typical server implementations (hardware and software). The "TN3270 client" component usually runs within the customer's workstation while the "TN3270 server" component is usually placed in front of the customer's Data Center mainframes (or sometimes directly within the mainframe itself) or within the customer's branch offices. As illustrated in FIG. 1, IP protocols are used between a TN3270 server (102) and TN3270 clients (101), while traditional SNA protocols are used between TN3270 server (102) and target SNA applications (103). The TN3270 client usually runs on an end user workstation.

Logical Units and Physical Units

The 3270 terminal environment includes a terminal controller with terminals attached to the controller. In SNA, the terminal controller is called a PU (Physical Unit), and the terminals are called LUs (Logical Units). The PU is utilized to communicate control information to the SNA host where the SNA application is located, and the LU is utilized by the SNA application for data communication with the terminal.

Each LU and PU in an SNA network is identified by a unique name. These names are called LU names and PU names, and are utilized to manage and control the LU and PU resources within the network. The SNA characteristics of PUs and LUs are defined in configuration tables within the SNA network.

When TN3270 servers are utilized to access SNA applications, PU and LU characteristics are also defined within these TN3270 servers. When multiple LUs have the same characteristics on a TN3270 server (for instance, all LUs which provide access to the same SNA application), the definition of these LUs are usually grouped within the TN3270 servers into one configuration container called a "LU pool".

The actual connection between a terminal and an SNA application is called a session. When communicating with an SNA application, a 3270 terminal actually has two sessions with the SNA host system in which the SNA application resides. One session is directly connected with the SNA application and the other session is connected directly to a VTAM (Virtual Telecommunications Access Method) software application that operates within the SNA host. VTAM provides System Services Control Point (SSCP) functions from the SNA host. The VTAM session is called the SSCP-LU session, and the session with the SNA application is called the LU-LU session (in VTAM, an application is just another Logical Unit).

Dynamic Definition of Dependent Logical Units

While LUs are usually defined in both the TN3270 server and in VTAM, Dynamic Definition of Dependent LUs (DDDLU) allows LUs to be defined only in the TN3270 server. In VTAM, one or a plurality of PUs must be defined, depending on the number of required LUs. The implementation of DDDLU also eliminates the definition and updates otherwise required by VTAM when additional LUs definition are later added. When a TN3270 extended client requests a connection to an SNA application utilizing one of the LUs defined in the TN3270 server, the TN3270 server sends a Reply/PSID command to VTAM. This commands delivers the local address of the LU and the device type information to VTAM. In response to a determination by VTAM from the PU definition that no definition for the LU currently exists, VTAM dynamically creates the required LU definition.

TN3270 Extended

The TN3270 protocol has been extended in the Request For Comments (RFCs) 2355 "TN3270 Enhancements" from the Internet Engineering Task Force (IETF). This extension of the TN3270 protocol is called TN3270 Extended (or TN3270E). One of the features of TN3270E is the ability for a TN3270E client to request that it be assigned a specific LU (also referred to as device name, or resource name) within the TN3270 server.

Dispatcher System

When multiple TN3270 servers are utilized to gain access to SNA applications located within a SNA network, a dedicated device called a "dispatcher system" is often utilized within the TCP/IP network for dispatching the traffic to these multiple TN3270 servers. The main goal of the dispatcher system is to balance the load across the multiple TN3270. For instance, when a very powerful TN3270 server and a smaller TN3270 server are available, more traffic should be dispatched on the very powerful TN3270 server than on the smaller one. Such dispatcher systems are either dedicated hardware devices, or software components installed on existing network devices such as IP routers.

More detailed explanations of telnet, TN3270, and Network Utility, can be found in the following publications incorporated herewith by reference:

"TCP/IP Tutorial and Technical Overview" by Martin W. Murhammer, Orcun Atakan, Stefan Bretz, Larry R. Pugh, Kazunari Suzuki, David H. Wood, International Technical Support Organization, October 1998, GG24-3376-05.

"Internet in a nutshell" by Valerie Quercia, published by O→Reilly, October 1997.

"IBM 2216/Network Utility Host Channel Connection", Erol Lengerli, Jacinta Carbonell, Thomas Grueter; IBM International Technical Support Organization, January 1999, SG24-5303-00.

"IBM Network Utility Description and Configuration Scenarios", Tim Kearby, Peter Gayek, Gallus Schlegel, Imre Szabo, Zhi-Yong Zhang; IBM International Technical Support Organization, January 1999, SG24-5289-00.

"Internetworking with TCP/IP—Volume I—Principles, Protocols, and Architecture" Douglas E.Comer, Second Edition, Prentice Hall 1991.

Request For Comments (RFCs) from the Internet Engineering Task Force (IETF):

RFC 1576: TN3270 Current Practices,
RFC 1646: TN3270 Extensions for LU name and Printer Selection,
RFC 1647: TN3270 Enhancements,
RFC 2355: TN3270 Enhancements.

Lack of centralized LU definitions within one or more TN3270 servers presents a problem in a TCP/IP networks. A TN3270 server provides access to SNA applications by means of sessions established across the SNA Network. The characteristics of such sessions must be configured within the TN3270 server and within the SNA Network (VTAM, for example). A TN3270 server is defined and behaves as a particular SNA LU (Logical Unit) resource for each session it supports.

A TN3270 server is configured with the characteristics (called SNA LU definition, or LU definition) of each LU defined to provide access to SNA applications. The configuration of all LU definitions within a TN3270 server is very often a time consuming operation which is typically performed manually by a network administrator.

Similarly, when multiple TN3270 servers are utilized within the TCP/IP network to access SNA applications located within a SNA network, each of the TN3270 servers is configured with the characteristics (LU Definition) of each LU defined to provide access to SNA applications. The configuration of all LU definitions within each TN3270 server is very time consuming task performed by the network administrator. Multiple TN3270 servers that provide access to the same SNA applications are often configured with similar LU definitions.

When multiple TN3270 servers are utilized within the TCP/IP network to access SNA applications within a SNA network, a dedicated device called a "dispatcher system" is often utilized for dispatching the traffic on these multiple TN3270 servers. The purpose the dispatcher system is to balance the load across multiple TN3270 servers, and to provide a TN3270 service continuity in case of failure of one TN3270 server. In this context, the TN3270 servers then belong to a "TN3270 server farm".

Within a TN3270 server farm in problem arises when similar LU definitions are configured on a plurality of TN3270 servers within a same TN3270 server farm. One solution to this problem is to configure every TN3270 server within the TN3270 server farm with the LU definitions. A problem with this solution is that configuring each individual TN3270 server with similar LU definitions is a repetitive and redundant operation that is very time consuming. Another problem with individually configuring each TN 3270 server with similar LU definition is that once each TN3270 server has been configured with LU definitions, updates must be implemented on each TN3270 server individually.

Individual LU definition configuration also requires that each TN3270 server must be statically configured with a LU definition for each possible session that it can support. This results in each TN3270 server being configured with a list of LUs that are reserved within the SNA Network for that TN3270 server, even if they are not utilized for a given server resulting in wasted resources. For example, for 1,000 TN3270 clients that may potentially access SNA applications through a TN3270 server during peak hours, 1000 LU definitions must be configured within this TN3270 server, and 1000 LUs are reserved within the SNA Network for this TN3270 server. If only 700 TN3270 clients actually access the TN3270 server, the remaining 300 LUs are not utilized and the associated reserved resources are wasted on both the TN3270 server and within the SNA network.

SUMMARY OF THE INVENTION

A method and system for centralizing the LU definitions for one or a plurality of TN3270 servers are disclosed herein. More particularly, a method and system for dynamically providing a Systems Network Architecture (SNA) Logical Unit (LU) definition for the establishment of a SNA session between a SNA client and a SNA application are disclosed herein. The method of the present invention includes receiving a SNA session request from a telnet 3270 client, and in response thereto, retrieving a definition of a SNA LU from a table shared by one or more telnet 3270 servers. A local table within the telnet 3270 server is dynamically updating with the retrieved SNA LU definition.

All objects, features, and advantages of the present invention will become apparent in the following detailed written description.

DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DESCRIPTION OF THE PREFERRED EMBODIMENT

Access to SNA Applications

Figure 2:
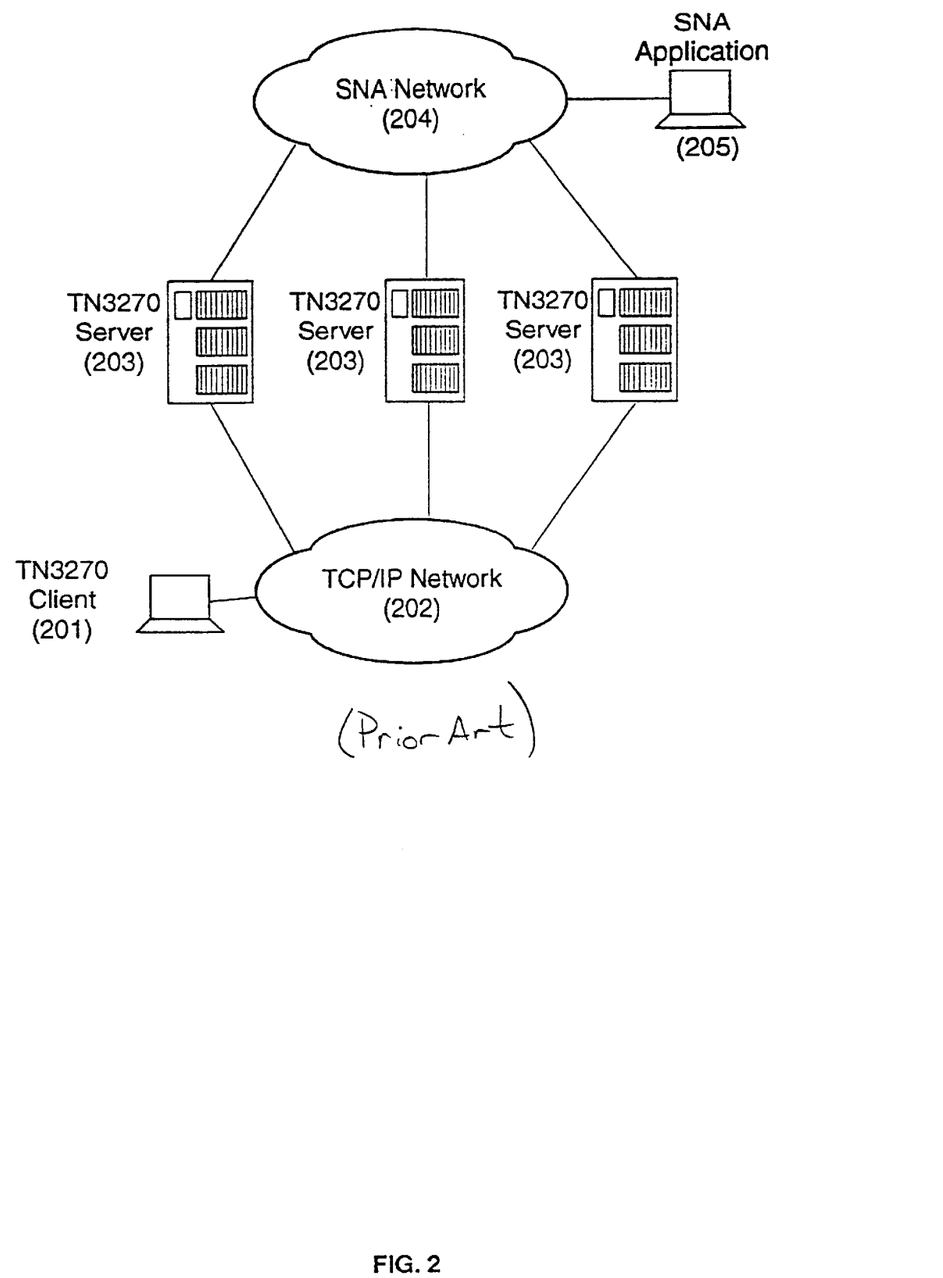
FIG. 2 is a pictorial view depicting conventional connectivity between a TN3270 client with multiple TN3270 servers and an SNA application.

FIG. 2 is a pictorial view depicting conventional connectivity between a TN3270 client with multiple TN3270 servers and an SNA application. As illustrated in FIG. 2, a TN3270 client 201 operates on a system (workstation) connected to an TCP/IP network 202. Multiple TN3270 servers 203 on TCP/IP network 202 connect the private TCP/IP network 202 to a (public) SNA network 204. A destination SNA application 205 is also connected to SNA network 204. It is important to note that TN3270 servers 203 connects two networks, and hence, act as intermediaries for communications between the two networks. Multiple TN3270 servers are often utilized in order to provide access robustness and load sharing.

IP Datagram

Figure 3:
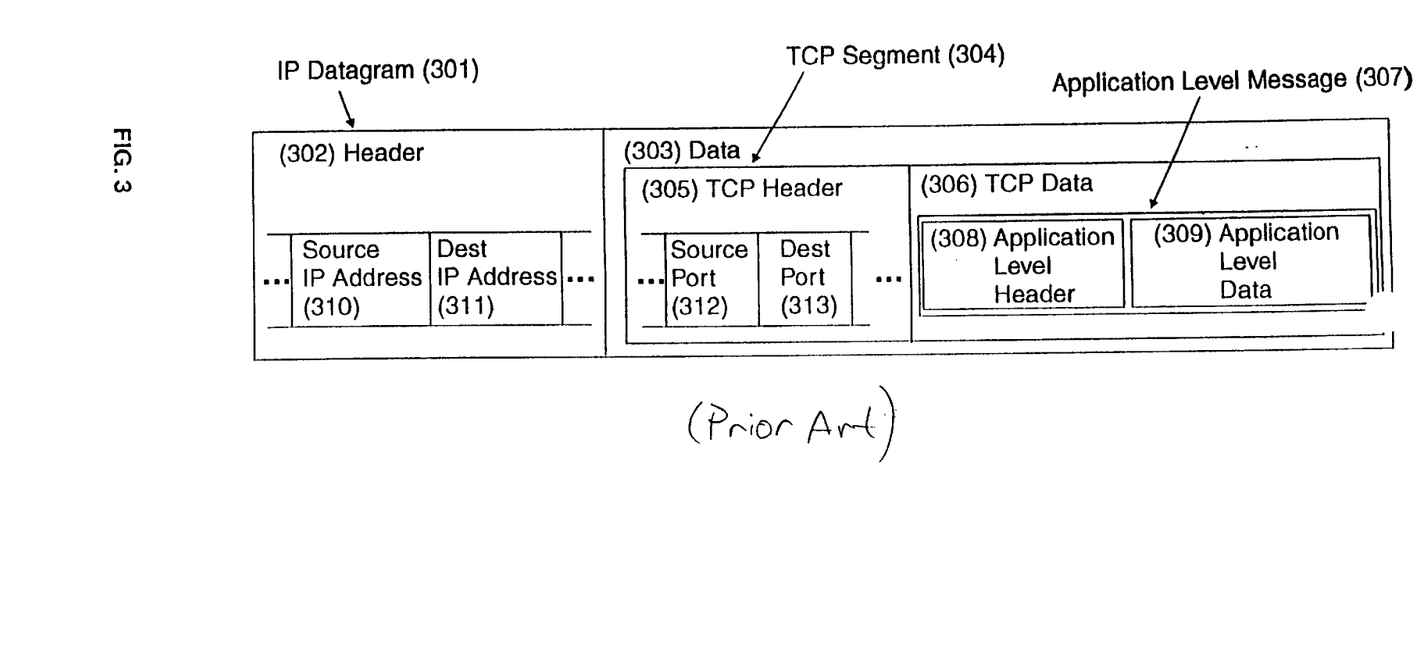
FIG. 3 illustrates a conventional IP datagram.

The transfer unit, or "data packet", in TCP/IP is referred to interchangeably herein as an "IP datagram". An IP datagram is made up of a header containing information for IP protocol processing, and data that is only relevant to higher level protocols. FIG. 3 depicts a format of a IP datagram as may be found in the environment described in FIGS. 1 and 2.

An IP datagram 301 is a message exchanged between computer systems across a TCP/IP network. As shown in FIG. 3, IP datagram 301 is divided into an IP datagram header 302, and IP datagram data 303. IP datagram header 302 includes a source IP address field 310 and a destination IP address 311. Source IP address field 310 contains the IP address of the computer (source device) which sends IP datagram 310. Destination IP address field 311 contains an IP address of the computer (destination device) to which IP datagram 311 is delivered. IP datagram data field 303 contains the data sent by the source to the destination computer system where the data is processed. Since the TCP/IP protocol suite is organized in layers, IP datagram data field 303 includes a message relevant to higher level protocols (TCP in the environments depicted herein). A TCP segment 304 embodies such a TCP message.

Within TCP segment 304 is a TCP header 305 that includes fields such as a source port 312 and the destination port 313 which identify the application protocol (e.g. HTTP, FTP, Telnet, TN3270 ) transported by TCP. This field is mainly utilized by the destination of the IP datagram to determine which application must process the data transported by TCP.

As depicted in FIG. 3, TCP segment 304 further includes a TCP data field 306 that contains application data 309 which is sent by the source to the destination computer system where the data is processed. TCP destination port field 313 contains the information relevant to the higher level Application Level protocol such as HTTP, FTP, Telnet, and TN3270.

TCP destination port field 313 contains an Application Level message 307 that may be, for example, a TN3270 message, a HTTP message, a FTP message, or a Telnet message. Depending on the Application Level protocol, Application Level message 307 can also be divided into an Application Level header 308 and an Application Level destination port field 309. Application Level header 308 is the header relevant to the application protocol such as HTTP, FTP, Telnet, TN3270. Application Level destination port field 309 contains data which is processed by the application responsible of handling the Application Level protocol. Data within Application Level destination port field 309 is typically relevant to the end user (for instance, data entered by an end user on his workstation). For TN3270, this data is also referred to as TN3270 data stream.

TN3270 Client and TN3270 Server

Figure 4:
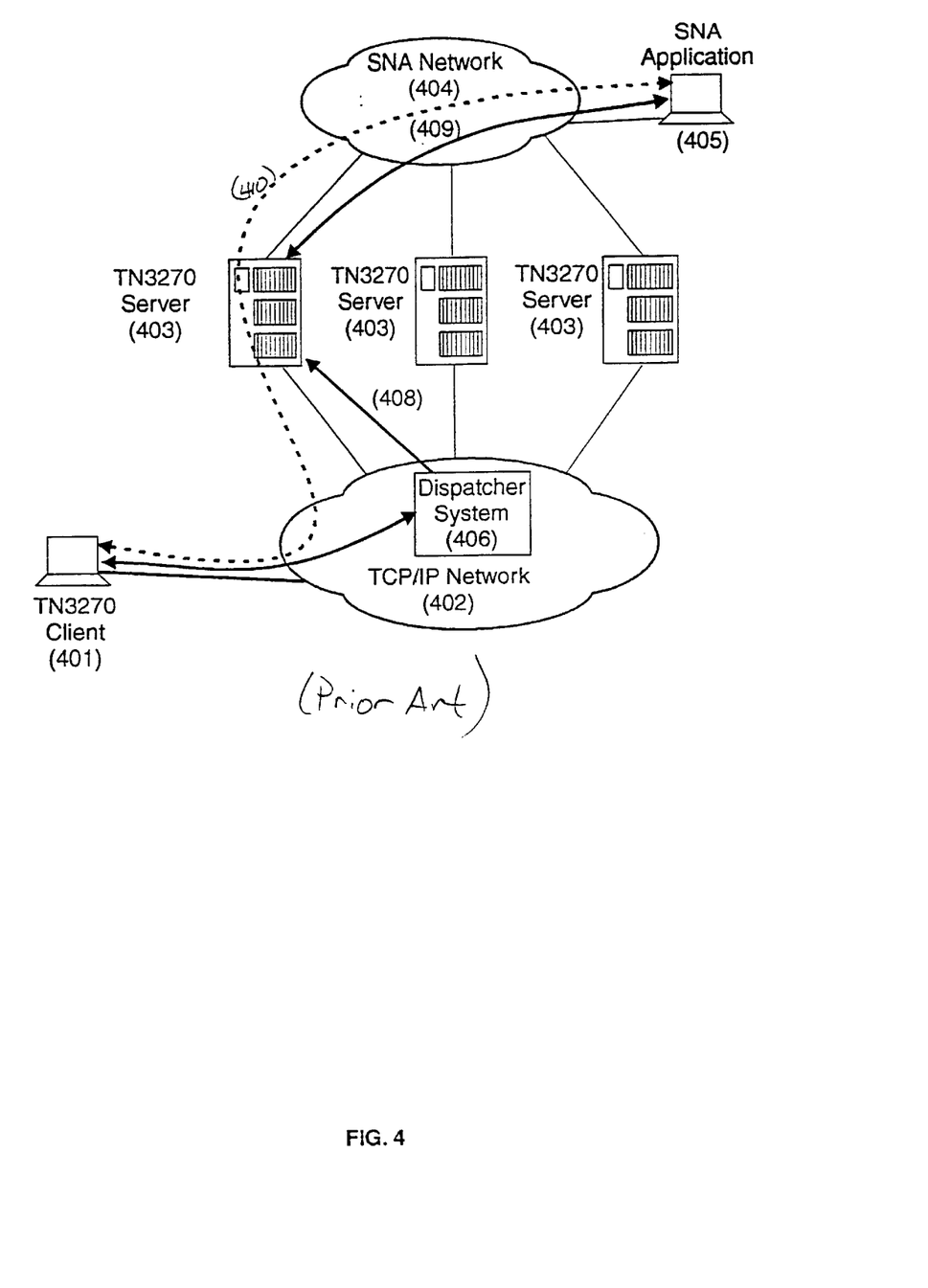
FIG. 4 is a pictorial view depicting a conventional access from a TN3270 client to an SNA application through a dispatcher system.

FIG. 4 shows a TN3270 client 401 operating on a device connected to a TCP/IP network 402. Multiple TN3270 servers 403 connect TCP/IP network 402 to a SNA network 404. A destination SNA application 405 is also connected to SNA network 404.

When multiple TN3270 servers 403 are utilized to access SNA applications within SNA network 404, a dispatcher system 406 provides load balancing across TN3270 servers 403. All of TN3270 servers 403 are accessed by TN3270 client 401 through dispatcher system 406 which operates as a virtual single TN3270 server. Dispatcher system 406 interacts with TN3270 client 401 as a TN3270 server. In this regard, when TN3270 client 401 sends an IP datagram to TN3270 servers 403, dispatcher system 406 receives the datagram, selects the TN3270 server that provides the best service, and forwards the IP datagram to the selected TN3270 server. The TN3270 server receives the IP datagram and relays 409 the TN3270 data contained within the IP datagram towards the SNA application. A TN3270 connection between TN3270 client 401 and TN3270 server 403 is then established, thus providing communication between TN3270 client 401 and SNA application 405.

Once TN3270 connection 410 is established between TN3270 client 401 and TN3270 server 403, and before any application data (the 3270 data stream) is exchanged between TN3270 client 401 and SNA application 405, the characteristics of the TN3270 traffic must be negotiated between TN3270 client 401 and the TN3270 server.

Each TN3270 server 403 is initially configured with the characteristics (called SNA LU definition, or LU definition) of each defined LU to provide access to SNA applications. For example, to permit 1000 TN3270 clients to access SNA applications through a TN3270 server, the TN3270 server must be configured with 1000 LU definitions.

The LU definition for each LU typically includes an SNA LU identifier (preferably a LU name) and some SNA characteristics of the SNA LU (characteristics of the session between the TN3270 server and the SNA application). When a TN3270 server receives a request for establishing a session from TN3270 client 401, the TN3270 server selects an available LU from the list of LUs which have been previously defined. The TN3270 server assigns the selected LU to TN3270 client 401. The TN3270 server then establishes a session with the SNA application 405 associated with the selected LU. TN3270 client 401 is then in communication with SNA application 405.

When the TN3270 extended protocol (as defined in the Request For Comments (RFCs) 2355 "TN3270 Enhancements" from the Internet Engineering Task Force (IETF)) is utilized between TN3270 client and the TN3270 server, TN3270 client 401 may request, during the establishment of the TN3270 session, an assignment of a specific LU defined within the TN3270 server. In such a case, TN3270 client 401 will access the SNA application associated with the specified LU.

Additionally, when TN3270 extended is utilized, TN3270 client 401 may also request the assignment of any LU included within a particular LU pool (an LU pool is a group of LU definitions) defined within the TN3270 server. In such a case, the TN3270 server selects one available LU within the specified LU pool, and TN3270 client 401 will have access to the SNA application associated with the selected LU.

One or a plurality of TN3270 servers 403 can be grouped in a "TN3270 server farm". TN3270 servers within a TN3270 server farm usually provide access to the same set of SNA applications. Multiple TN3270 server farms can then be defined to provide access to multiple sets of SNA applications. For example, a first TN3270 server farm (farm1) can be utilized to provide access to SNA applications located in France, and a second farm (farm2) can be utilized to provide access to SNA applications located in Germany. Each TN3270 server within farm1 is configured with LU definitions of LUs associated with SNA applications located in France. Each TN3270 server within farm2 is configured with LU definitions of LUs associated with SNA applications located in Germany.

TN3270 Server System

Figure 5:
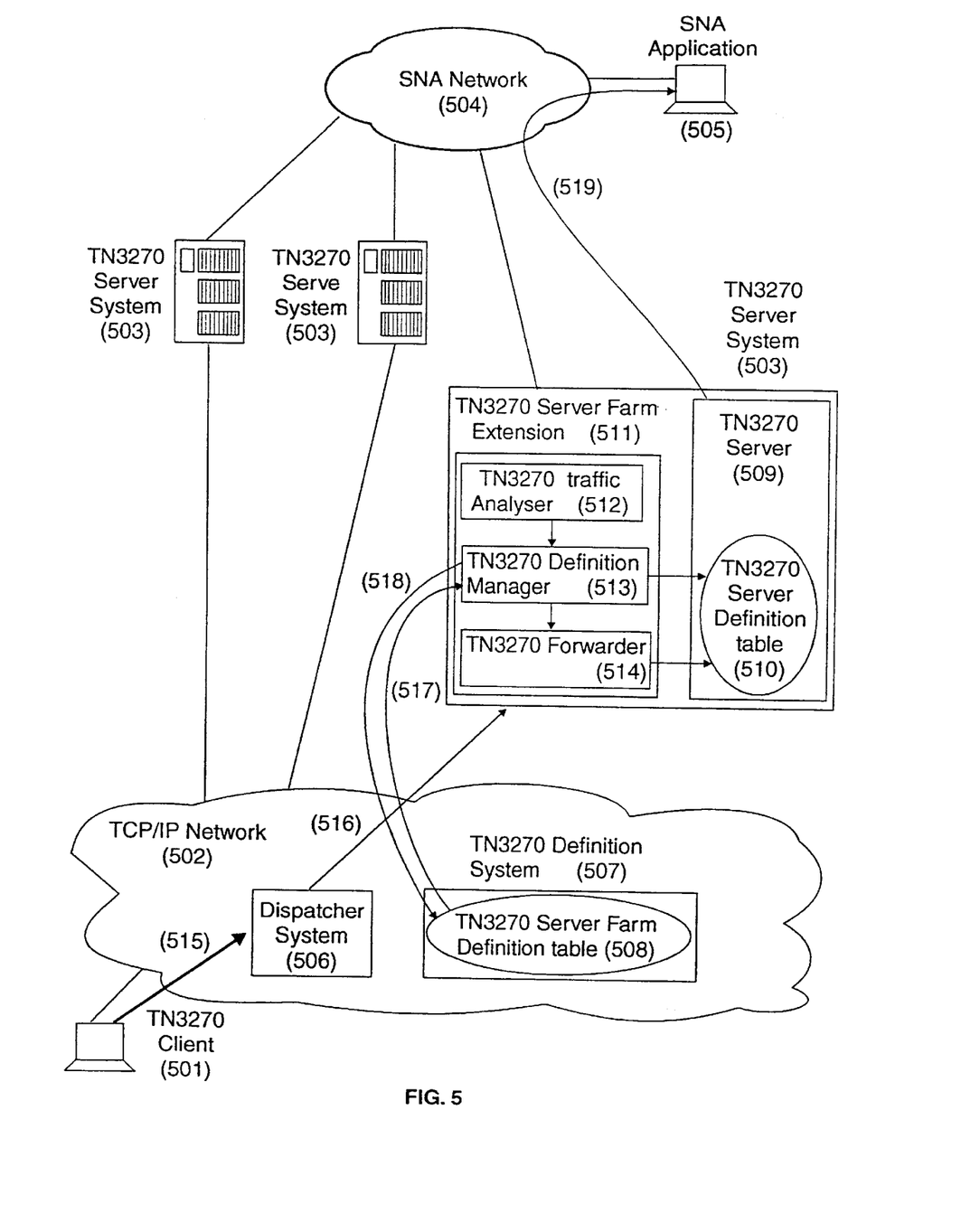
FIG. 5 illustrates a server utilizing centralized LU definitions in accordance with a preferred embodiment of the present invention.

The system and method of the present invention provide an efficient means for centralizing LU definitions associated with one or more TN3270 servers, or for one or a plurality of server farms. With reference to FIG. 5, there is illustrated a server utilizing centralized LU definitions in accordance with a preferred embodiment of the present invention.

As depicted in FIG. 5, a device including a TN3270 client 501 is connected to a TCP/IP network 502. Included within a TN3270 server farm, multiple TN3270 servers systems 503 are available to access a SNA application 505 that is attached to a SNA Network (504). A dispatcher system 506 is located within TCP/IP network 502.

Dispatcher system 506 dispatches TN3270 traffic over multiple TN3270 servers systems 503.

In accordance with an important feature of the present invention, a TN3270 definition system 507 is implemented within TCP/IP network 502. The purpose of TN3270 definition system 507 is to centralize the LU definitions for all TN3270 servers 503 within the TN3270 server farm. Definition system 507 is configured with a TN3270 server farm definition table 508. TN3270 server farm definition table 508 includes the LU definition of each LU that can be utilized by the TN3270 servers 503 within the TN3270 server farm to access a SNA application 505. TN3270 definition system 507 is configured with one TN3270 server farm definition table per TN3270 server farm. Two mirrored TN3270 definition systems can possibly be utilized in order to ensure a high availability of the table. For example, it is possible to utilize a dispatcher system in front of the two systems.

Each TN3270 server system 503 includes a TN3270 server component 509 and a TN3270 server farm extension component 511. Each TN3270 server system 503 within the TN3270 server farm is configured with all the parameters required by the TN3270 server component such as the PU (Physical Unit) definitions. The configuration parameters are stored within each TN3270 server in a TN3270 server definition table 510 within server component 509. However, each TN3270 server is not initially configured with the LU definitions stored in TN3270 definition system 507.

TN3270 Server Farm Extension

A dispatcher system 506 receives an IP datagram on line 515 originated by client 501. Dispatcher system 506 then selects the optimal TN3270 server to which the IP datagram should be forwarded on line 516. In making the server selection, dispatcher system 506 can utilize any existing load balancing algorithm based, for example, on the number of active TN3270 connections handled by each TN3270 server or/and based on the capacity of each TN3270 server.

The IP datagram is received by the selected TN3270 server system 503 and is forwarded to TN3270 server farm extension component 511 which forwards the IP datagram in sequence to its multiple components. The first of these components, a TN3270 traffic analyzer component 512, analyses the IP datagram and determines if a new LU definition is required within the TN3270 server. A TN3270 definition manager component 513 retrieves via signal lines 518 and 517, an available LU definition from TN3270 server farm definition table 508 stored in TN3270 definition system 507. TN3270 definition manager component 513 also dynamically updates a TN3270 server definition table 510 with the LU definition, wherein TN3270 server definition table 510 is stored within TN3270 server component 509. Finally, a TN3270 forwarder component 514 updates the IP datagram if required, and forwards the IP datagram to TN3270 server component 509.

When a SNA session has been established between TN3270 server 503 and a destination SNA application 505, TN3270 server component 509 ultimately forwards the TN3270 data included within the IP datagram to destination SNA application 505 on line 519.

Before establishing a new session with destination SNA application 505, TN3270 server 503 dynamically updates the VTAM configuration (preferably utilizing dynamic definition of dependent LU (DDDLU)) with the SNA characteristics of the LU. The SNA characteristics are included within the LU definition forwarded by TN3270 definition manager component 513.

Internal Table of the TN3270 Definition System

Figure 6:
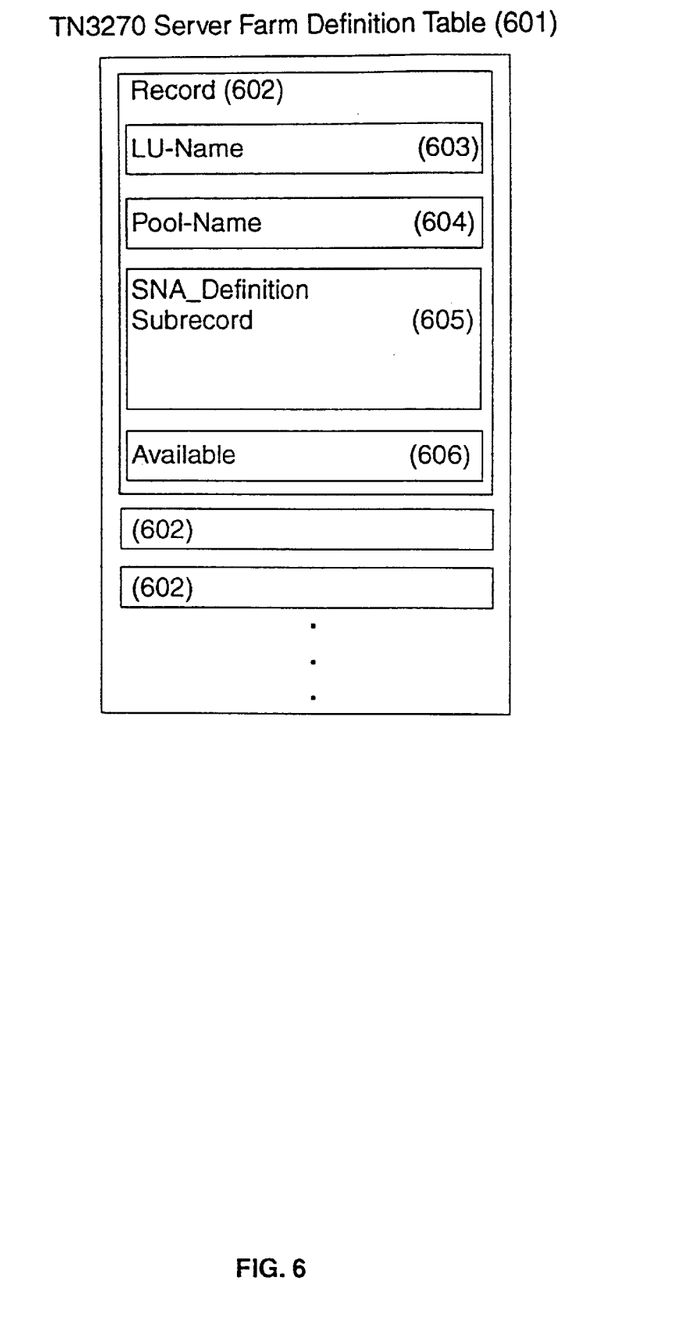
FIG. 6 depicts internal tables utilized by the TN3270 server farm extension in accordance with a preferred embodiment of the present invention.

FIG. 6 depicts a TN3270 server farm definition table 601 in accordance with a preferred embodiment of the present invention. This TN3270 server farm definition table 601 is located in the TN3270 definition system 507. Definition table 601 includes the LU definition of each LU supported by the TN3270 servers belonging to the TN3270 server farm. Definition table 601 is referenced by TN3270 definition manager component 513 to retrieve LU definitions. TN3270 server farm definition table 601 is typically created (by a network administrator, for example) before starting the TN3270 servers systems 503.

When multiple TN3270 server farms retrieve LU definitions from a single TN3270 definition system, one TN3270 server farm definition table must be configured for each TN3270 server farm.

TN3270 server farm definition table 601 (a flat file in a preferred embodiment) is created by the network administrator for the SNA network. Within each of multiple records 602, definition table 601 associates with each LU name 603: a pool Name 604, SNA-specific characteristics of the LU 605; and an indication of the LU availability 606.

Within each of records 602, is an entry for each of the following categories of information: LU_Name 603, Pool_Name 604, SNA_Definition subrecord 605, and Available 606. LU_Name 603 is the name of the LU, utilized to identify the LU within the SNA Network and within the TN3270 server. LU_Name 603 also identifies the SNA application associated with the LU. Pool_Name 604 is the name of the LU pool within which the selected LU is contained. An LU pool is a group of LUs which have similar characteristics (for example, all LUs which can be utilized to access one specific SNA application). This field is optional, and the default value is "ANY" which means that the LU belongs to one default LU pool called "ANY".

SNA_Definition subrecord 605 is a subrecord which includes the detailed SNA characteristics of the LU requested by the TN3270 server. The SNA characteristics are referenced by TN3270 definition manager 513 to dynamically create an LU definition in the TN3270 server definition table 510. The detailed list of fields included in SNA_Definition subrecord 605 depends on the implementation of the TN3270 server component. A typical SNA_

Definition subrecord may include, for example, at least the LU_Type and the Locaddr (the Local Address) SNA parameters usually required to define an LU.

Available 606 is an indication of the availability of the selected LU. The possible values within Available 606 include: "Yes", which means that the LU is available and can be utilized to establish a new session with an SNA application; and "No", which means that the LU is already utilized for an active session with an SNA application, and that therefore this LU cannot be utilized to establish a new session.

TN3270 Traffic Analyzer

Figure 7:
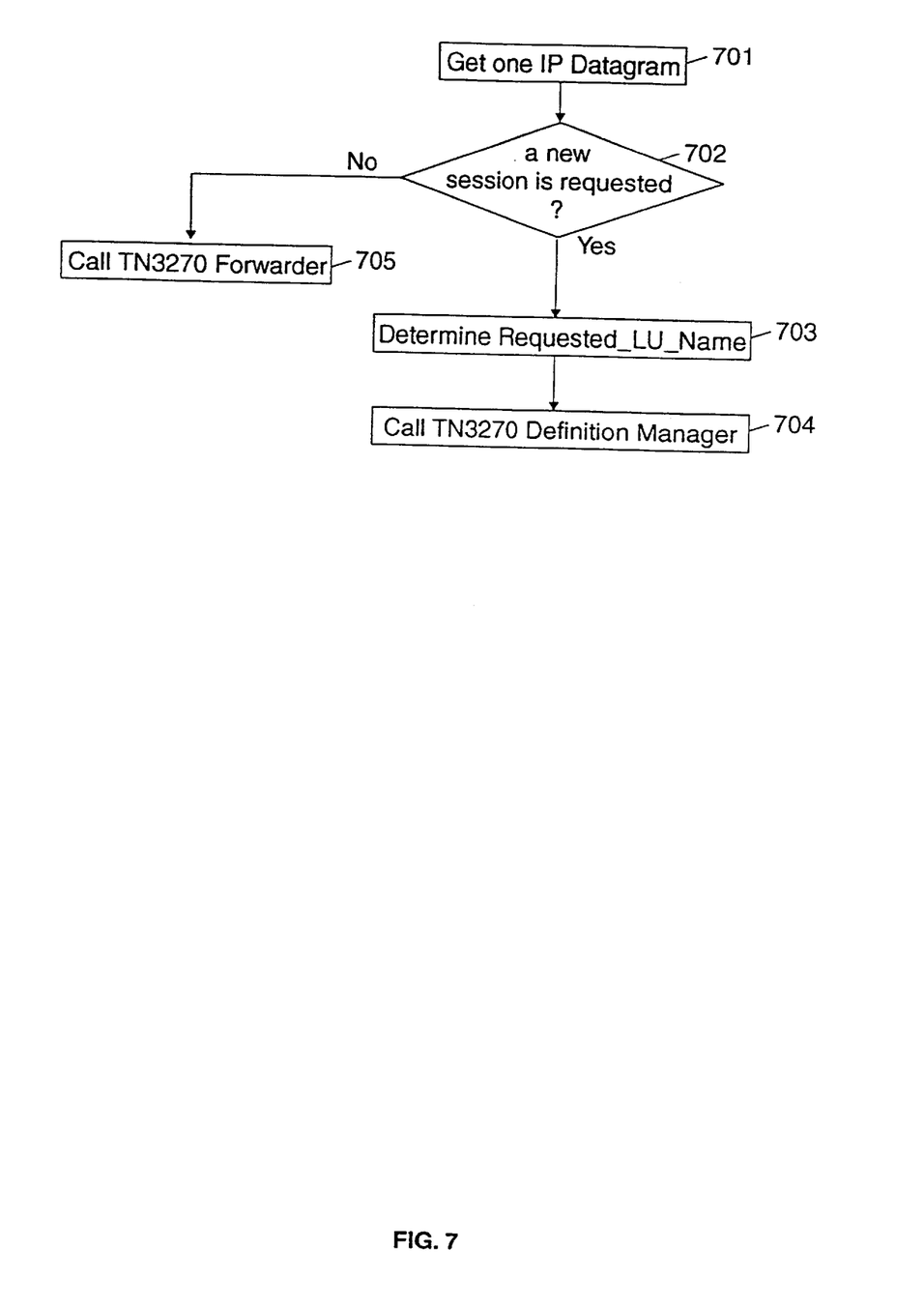
FIG. 7 is a flow diagram illustrating the logic flow in a TN3270 traffic analyzer implemented within a TN3270 server system in accordance with a preferred embodiment of the present invention.

TN3270 traffic analyzer component 512 of the TN3270 server farm extension component 511 is preferably a program running on the TN3270 server system 503. TN3270 traffic analyzer 512 is utilized to determine whether or not a new LU definition must be created within the TN3270 server to accommodate a given session. Turning now to FIG. 7, there is depicted a flow diagram illustrating the internal logic flow of TN3270 traffic analyzer component 512 in accordance with a preferred embodiment of the present invention.

The process is initiated as shown at step 701 with a retrieval of an IP datagram by TN3270 traffic analyzer 512. Next, as illustrated at step 702, TN3270 traffic analyzer 512 determines whether or not a new session is requested. When a TN3270 client connects to the TN3270 server and requests the establishment of a new session with an SNA application, a new LU definition associated with the new session must be created within the TN3270 server so that the TN3270 server is able to establish the new session.

The establishment of a new session with an SNA application is requested when a specific TN3270 message (an application level message 307) is exchanged between a TN3270 client and the TN3270 server. This specific TN3270 message 307 includes a TN3270 command which is preferably identified by a "Interpreted as Command" (IAC) leading character.

If the TN3270 Extended option is negotiated between the TN3270 client and the TN3270 server, TN3270 traffic analyzer 512 preferably determines whether or not the TN3270 message 307 sent by the TN3270 client includes a TN3270 "CONNECT" command. If the TN3270 message includes a "CONNECT" command, then the TN3270 client requests the establishment of a session with a SNA application, and a new LU definition associated with this new session is required within the TN3270 server.

If the TN3270 Extended option is not negotiated between the TN3270 client and the TN3270 server, TN3270 traffic analyzer 512 preferably determines whether or not the TN3270 message 307 sent by the TN3270 client includes a TN3270 "TERMINAL-TYPE" command or not. If the TN3270 message includes a TN3270 "TERMINAL_TYPE" command, the TN3270 client requests the establishment of a session with a SNA application, and a new LU definition associated with this new session is required within the TN3270 server. The content of TN3270 application level message 307 may possibly be utilized to determine whether or not a new session is requested, and can be a configuration parameter within the TN3270 server farm extension component. If a new session is not requested, a new session is either not yet requested, or has already been established. The IP datagram can then be forwarded to the TN3270 server.

Proceeding to step 705, if a new session is not requested, TN3270 traffic analyzer 512 calls TN3270 forwarder component 514. If a new session is requested, a new LU definition associated with that new session is required within the TN3270 server in order to establish the new session. Step 703 depicts TN3270 traffic analyzer 512 determining the name (called Requested_LU_Name) of the LU requested by the TN3270 client. Different session setup scenarios affecting how step 703 is performed can be summarized as follows.

When a TN3270 server receives a request to establish a new session with an SNA application from a TN3270 client, the TN3270 server selects one available LU. The TN3270 server assigns the selected LU to the TN3270 client. The TN3270 server establishes a session with the SNA application associated with the selected LU. The TN3270 client is then in communication with the SNA application.

When the TN3270 Extended protocol is utilized between the TN3270 client and the TN3270 server, the TN3270 client may request in a "CONNECT" command the assignment of a specific LU defined within the TN3270 server. In this case, the TN3270 client has access to the SNA application which is associated with the specific LU.

When TN3270 Extended is utilized, the TN3270 client may also request in a "CONNECT" command the assignment of any LU included within a specific LU pool (an LU pool is a group of LU definitions) defined within the TN3270 server. In this case, the TN3270 server selects one available LU within the specific LU pool, and the TN3270 client will have access to the SNA application associated with the selected LU.

In view of the foregoing, the Requested_LU_Name is therefore determined at step 703 as follows. By default, the Requested_LU_Name is set to "ANY", which means that the TN3270 client does not request any specific LU or LU pool. In this case, the Requested_LU_Name is therefore a pool name ("ANY" is the name of the default pool).

When the IP datagram includes a TN3270 message which is a TN3270 "CONNECT" command (identified in (702)), the Requested_LU_Name is extracted from the "device_name" field (also called "resource_name") of the TN3270 message. The Requested_LU_Name is either an LU name or a pool name.

The logic processing depicted in FIG. 7 concludes as shown at step 704, with TN3270 traffic analyzer 512 calling TN3270 definition manager component 513.

TN3270 Definition Manager

Figure 8:
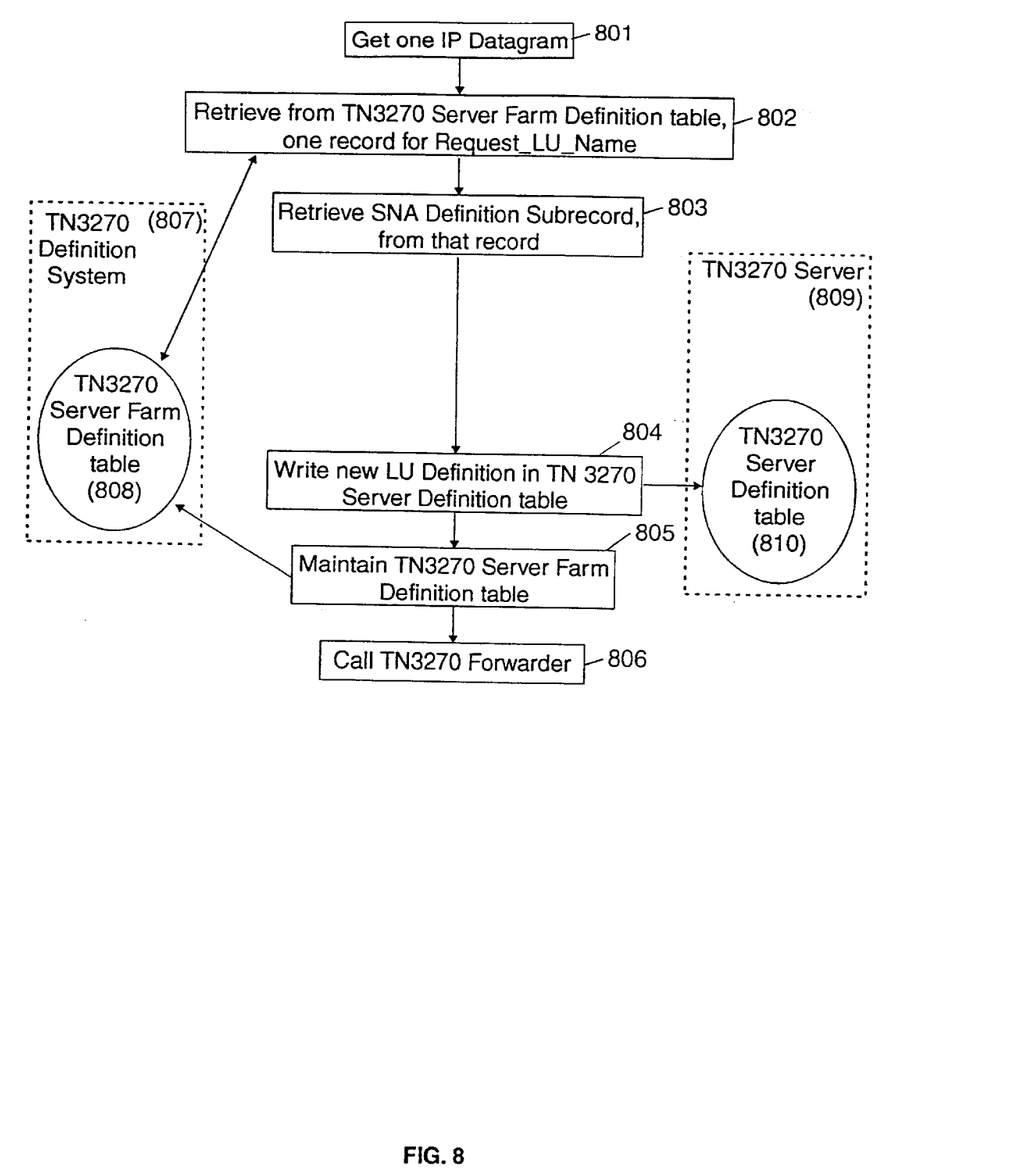
FIG. 8 is a flow diagram depicting the logic flow of a TN3270 definition manager implemented within a TN3270 server system in accordance with a preferred embodiment of the present invention.

TN3270 definition manager 513 is preferably a program running on the TN3270 server system. TN3270 definition manager 513 retrieves available LU definitions from TN3270 server farm definition table 508, and dynamically updates TN3270 server definition table 510 with the LU definitions. FIG. 8 is a flow diagram depicting the internal logic flow of the TN3270 definition manager component in accordance with a preferred embodiment of the present invention.

As illustrated at step 801 TN3270 definition manager 513 receives the IP datagram forwarded by TN3270 traffic analyzer 512 (along with its Requested_LU_Name). Next, TN3270 definition manager 513 retrieves one record for the Requested_LU_Name from the TN3270 server farm definition table as shown at step 802.

The process of retrieving one record from the TN3270 server farm definition table as depicted at step 802, further includes accessing a TN3270 definition system 807 wherein a TN3270 server farm definition table 808 is located. The identifier (typically the IP address) of TN3270 definition system 807 is preferably a configuration parameter of the TN3270 server farm extension component. Retrieving step 802 also includes retrieving one record from the server farm definition table (called "record_R") that satisfies two conditions. First, the Requested_LU_Name determined by the TN3270 traffic analyzer component must includes either an LU name, or a pool name, and second, the Requested_LU_Name must be primarily interpreted as an LU name, and "record_R" must therefore satisfy both of the following two conditions: LU_Name=Requested_LU_Name; and Available="Yes".

If no record within the server farm definition table 808 satisfies the above conditions, the Requested_LU_Name is then interpreted as a pool name, and "record R" must therefore satisfy both of the following two conditions: Pool_Name=Requested_LU_Name, and Available="Yes".

Retrieving step 802 further includes marking "record_R" as not available within TN3270 server farm definition table 808 (i.e., Available="No").

The above steps for retrieving one record from TN3270 server farm definition table 9808) can be implemented utilizing FTP (File Transfer Protocol) protocol between TN3270 definition manager 513 and TN3270 definition system 807. Preferably, the above steps can also be implemented by means of a CGI (Common Gateway Interface) program running on the TN3270 definition system utilizing the HTTP protocol between the TN3270 definition manager and TN3270 definition system 807.

Proceeding to step 803, TN3270 definition manager 513 retrieves the SNA_Definition subrecord from "record_R". As depicted at step 804, TN3270 definition manager 513 writes a new LU definition in TN3270 server definition table 810. The process of writing a new LU definition in TN3270 server definition table 810 as illustrated at step 804 includes retrieving the SNA characteristics of the LU from the SNA_Definition subrecord of "record_R".

Step 804 further includes building one LU definition record including the retrieved SNA characteristics of the LU. The structure of the LU definition record is independent of the invention, and depends on the implementation of the TN3270 server 809 and on the internal structure of the TN3270 server definition table 810. Finally, the LU definition record is written in TN3270 server definition table 810.

After writing the new LU definition record, as depicted at step 805, TN3270 definition manager 513 maintains the TN3270 server farm definition table 808. The step of maintaining the TN3270 server farm definition table includes identifying LUs that are no longer in use, and therefore available for a new session. A LU is no longer in use if the associated TN3270 connection is closed (between the TN3270 client and the TN3270 server), or if the associated SNA session is closed (between the TN3270 server and the SNA application).

Closed TN3270 connections are detected, for example, utilizing FIN and ACK indications in the TCP header of a packet. Optionally, a TN3270 connection is considered closed after an elapse of a predetermined period of time over which no IP datagrams are transmitted on that TN3270 connection (this timer value can be for example a configuration parameter of the TN3270 server farm extension). Any other existing algorithm to detect closed or half closed (for example when one extremity of the connection has abnormally terminated) TCP connections can also be utilized to remove such connections from the table. TN3270 definition manager 513 can also interface with the TN3270 server component 809 to identify which SNA sessions have been closed (hence the associated LUs are no longer utilized).

Finally, the step of maintaining the server farm definition table includes, updating the Available field of the associated record in the TN3270 server farm definition table for each LU no longer in use (i.e., Available="Yes"). The logic flow of TN3270 definition manager 513 concludes as shown at step 806 with TN3270 definition manager 513 calling TN3270 forwarder 514.

TN3270 Forwarder

Figure 9:
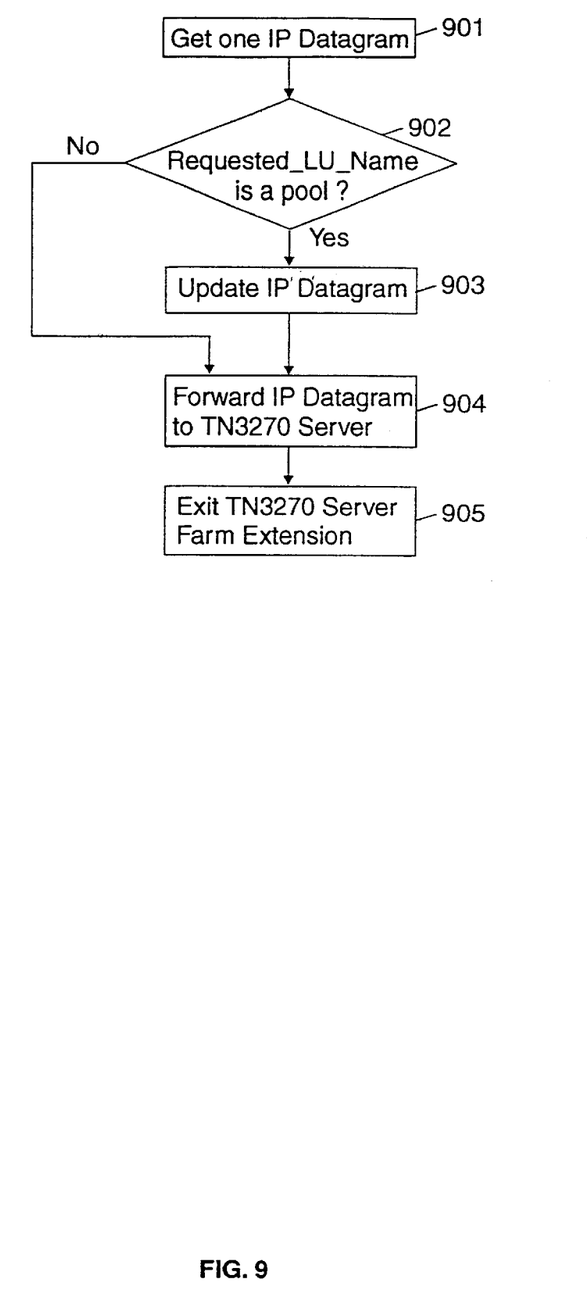
FIG. 9 is a flow diagram illustrating the logic flow of a TN3270 forwarder implemented within a TN3270 server system in accordance with a preferred embodiment of the present invention.

TN3270 forwarder component 514 is preferably a program running on a TN3270 server system. This component updates the IP datagram if required, and forwards the IP datagram to the TN3270 server component. FIG. 9 is a flow diagram illustrating the internal logic flow of TN3270 forwarder 514.

As illustrated at step 901, TN3270 forwarder 514 receives the IP datagram forwarded by TN3270 traffic analyzer component (along with its Requested_LU_Name which has been determined by the TN3270 traffic analyzer component, and the "record_R" which has been determined by the TN3270 definition manager component). Next, TN3270 forwarder 514 determines whether or not the Requested_LU_Name is a pool name as shown at step 902. In making this determination TN3270 forwarder 514 examines the Pool_Name field of "record_R". If Pool_Name =Requested_LU_Name, then the Requested_LU_Name is a pool name.

If at step 902 TN3270 forwarder 514 determines that the Requested_LU_Name is a pool name, the IP datagram includes a TN3270 application level "CONNECT" command message 307. This implies that the Requested_LU_Name information has been retrieved from the "device_name" field of the TN3270 message by the TN3270 traffic analyzer component. A new LU definition has been generated by TN3270 definition manager 513 in the TN3270 server definition table 810 included in the TN3270 server 809.

Proceeding to step 903, TN3270 forwarder 514 updates the IP datagram. The "device_name" field included in the TN3270 "CONNECT" command is updated with the name of the LU. The name of the LU is included in the LU definition previously written in the TN3270 server definition table by the TN3270 definition manager component such that "Device_name"=LU_Name (from "record_R").

This update is required since the TN3270 server which receives and processes the IP datagram does not know the LU pool (Requested_LU_Name) requested by the TN3270 client. The TN3270 server has knowledge of the LU (the LU definition has been created in its TN3270 server definition table).

If the TN3270 server can be initially configured with empty LU pools, and if the empty LU pools can be dynamically updated with new LU definitions, the update process depicted at step 903 is not required because in this case the TN3270 server has knowledge of the LU pool (Requested_LU_Name) requested by the TN3270 client.

The logic flow continues as illustrated at step 904, with TN3270 forwarder 514 forwarding the IP datagram to the TN3270 server component. Finally, TN3270 forwarder 514 exits the TN3270 server farm extension component and waits for the next IP datagram to process as depicted at step 905.

Advantages

The present inventions provides the following advantages.

The TN3270 servers within a TN3270 server farm do not have to be statically configured with the LU definitions. There is no need for such a time consuming and costly configuration operation of each TN3270 server.

The LU definitions are centralized within a single system. The LU definitions can therefore be easily controlled and maintained (by a Network Administrator for example). Updates of LU definitions are performed on the TN3270 definition system instead of being performed on multiple TN3270 servers.

The total number of LU definitions that have to be configured on the TN3270 definition system is minimized, because the TN3270 servers do not need to be statically configured with the maximum of LU definition they can possibly handle. For example, if 1000 TN3270 clients can possibly access SNA applications through one TN3270 server in the morning and only 500 in the afternoon, and if 1000 TN3270 clients can possibly access SNA applications through another TN3270 server in the afternoon and only 500 in the morning, the TN3270 definition system will be configured with only 1500 LU definitions because a maximum of 1500 LUs will be utilized concurrently. With a static configuration on each TN3270 server, 2000 LU definitions would be configured (1000 on each TN3270 server).

The number of reserved resources within the SNA Network is minimized. Since the total number of LU definitions configured on the TN3270 definition system is minimized, the number of reserved resources (for example global number of reserved control blocks) will be therefore minimized.

The number of wasted resources within the TN3270 servers and within the SNA network is reduced. For example, if 1000 TN3270 clients can possibly access SNA applications through one TN3270 server during peak hours, 1000 LU definitions will be configured within the TN3270 definition system to cope with this maximum traffic. When only 700 TN3270 clients actually access the TN3270 server, the remaining 300 LUs are not wasted and can be utilized by another TN3270 server within the farm.

While the invention has been particularly shown and described with reference to a preferred embodiment, it will be understood that various changes in form and detail may be made therein without departing from the spirit, and scope of the invention.

What is claimed is:

1. A method within a telnet server for dynamically providing a systems network architecture (SNA) logical unit definition to support the establishment of an SNA session between a telenet client and an SNA application, said method comprising:

connecting said telenet client to a plurality of telnet servers via a TCP/IP network, wherein said telenet client communicates with said plurality of telnet servers using IP protocols;

connecting said SNA application to said plurality of telnet servers via an SNA network, wherein said SNA application communicates with said plurality of telnet servers using SNA protocols;

in response to an SNA session request from said telnet client via a datagram, retrieving a definition of an SNA logical unit from a server farm definition table that is shared by said plurality of telnet servers, wherein said server farm definition table is resided within said TCP/IP network; and dynamically updating a server definition table located within one of said plurality of telnet servers through which said SNA session is established with said retrieved SNA logical unit definition.

2. The method of claim 1, wherein said SNA logical unit includes an identification of said SNA logical unit; and
SNA characteristics of said SNA logical unit.

3. The method of claim 1, wherein said method further includes updating said SNA session request with said retrieved SNA logical definition.

4. The method of claim 1, wherein said SNA session request includes a request for an assignment of an available SNA logical unit, and wherein said retrieving a definition further includes retrieving a definition of an available SNA logical unit from said server farm definition table.

5. The method of claim 1, wherein said SNA session request includes a request for an assignment of a specific SNA logical unit, and wherein said retrieving a definition further includes retrieving a definition of said specific SNA logical unit from said server farm definition table.

6. The method of claim 1, wherein said SNA session request includes a request for an assignment of a SNA logical unit within a logical unit pool, and wherein said retrieving a definition further includes retrieving a definition of an available SNA logical unit within said logical unit pool from said server farm definition table.

7. The method of claim 1, wherein said server farm definition table is shared between said plurality of Telnet servers belonging to a same Telnet dispatcher.

8. The method of claim 1, wherein each logical unit within said server farm definition table includes an identification of an SNA logical unit;
SNA characteristics of said logical unit; and
an indication of availability of said logical unit.

9. An apparatus within a telnet server for dynamically providing a systems network architecture (SNA) logical unit definition to support the establishment of an SNA session between a telenet client and an SNA application, said apparatus comprising:

means for connecting said telenet client to a plurality of telnet servers via a TCP/IP network, wherein said telenet client communicates with said plurality of telnet servers using IP protocols;

means for connecting said SNA application to said plurality of telnet servers via an SNA network, wherein said SNA application communicates with said plurality of telnet servers using SNA protocols;

in response to an SNA session request from said telnet client via a datagram, means for retrieving a definition of an SNA logical unit from a server farm definition table that is shared by said plurality of telnet servers, wherein said server farm definition table is resided within said TCP/IP network; and means for dynamically updating a server definition table located within one of said plurality of telnet servers through which said SNA session is established with said retrieved SNA logical unit definition.

10. The apparatus of claim 9, wherein said SNA logical unit includes an identification of said SNA logical unit; and
SNA characteristics of said SNA logical unit.

11. The apparatus of claim 9, wherein said apparatus further includes updating said SNA session request with said retrieved SNA logical definition.

12. The apparatus of claim 9, wherein said SNA session request includes a request for an assignment of an available SNA logical unit, and wherein said means for retrieving a definition further includes means for retrieving a definition of an available SNA logical unit from said server farm definition table.

13. The apparatus of claim 9, wherein said SNA session request includes a request for an assignment of a specific SNA logical unit, and wherein said means for retrieving a definition further includes means for retrieving a definition of said specific SNA logical unit from said server farm definition table.

14. The apparatus of claim 9, wherein said SNA session request includes a request for an assignment of a SNA logical unit within a logical unit pool, and wherein said means for retrieving a definition further includes means for retrieving a definition of an available SNA logical unit within said logical unit pool from said server farm definition table.

15. The apparatus of claim 9, wherein said server farm definition table is shared between said plurality of Telnet servers belonging to a same Telnet dispatcher.

16. The apparatus of claim 9, wherein each logical unit within said server farm definition table includes an identification of an SNA logical unit;

SNA characteristics of said logical unit; and an indication of availability of said logical unit.

17. A computer program product within a telnet server for dynamically providing a systems network architecture (SNA) logical unit definition to support the establishment of an SNA session between a telnet client and an SNA application, said computer program product comprising:

program code means for connecting said telenet client to a plurality of telnet servers via a TCP/IP network, wherein said telenet client communicates with said plurality of telnet servers using IP protocols;

program code means for connecting said SNA application to said plurality of telnet servers via an SNA network, wherein said SNA application communicates with said plurality of telnet servers using SNA protocols;

in response to an SNA session request from said telnet client via a datagram, program code means for retrieving a definition of an SNA logical unit from a server farm definition table that is shared by said plurality of telnet servers, wherein said server farm definition table is resided within said TCP/IP network; and program code means for dynamically updating a server definition table located within one of said plurality of telnet servers through which said SNA session is established with said retrieved SNA logical unit definition.

18. The computer program product of claim 17, wherein said SNA logical unit includes an identification of said SNA logical unit; and SNA characteristics of said SNA logical unit.

19. The computer program product of claim 17, wherein said computer program product further includes updating said SNA session request with said retrieved SNA logical definition.

20. The computer program product of claim 17, wherein said SNA session request includes a request for an assignment of an available SNA logical unit, and wherein said program code means for retrieving a definition further includes program code means for retrieving a definition of an available SNA logical unit from said server farm definition table.

21. The computer program product of claim 17, wherein said SNA session request includes a request for an assignment of a specific SNA logical unit, and wherein said program code means for retrieving a definition further includes program code means for retrieving a definition of said specific SNA logical unit from said server farm definition table.

22. The computer program product of claim 17, wherein said SNA session request includes a request for an assignment of a SNA logical unit within a logical unit pool, and wherein said program code means for retrieving a definition further includes program code means for retrieving a definition of an available SNA logical unit within said logical unit pool from said server farm definition table.

23. The computer program product of claim 17, wherein said server farm definition table is shared between said plurality of Telnet servers belonging to a same Telnet dispatcher.

24. The computer program product of claim 17, wherein each logical unit within said server farm definition table includes an identification of an SNA logical unit;

SNA characteristics of said logical unit; and an indication of availability of said logical unit.

\* \* \* \* \*